United States Patent [19]

Hemens

[11] 4,238,972
[45] Dec. 16, 1980

[54] REMOTE CONTROL MECHANISMS

[75] Inventor: James F. Hemens, Billericay, England

[73] Assignee: Teleflex Morse Limited, Basildon, England

[21] Appl. No.: 934,743

[22] Filed: Aug. 21, 1978

[30] Foreign Application Priority Data

Sep. 29, 1977 [GB] United Kingdom ............... 40593/77
Jan. 4, 1978 [GB] United Kingdom .................. 235/78

[51] Int. Cl.³ ........................................... B60K 20/04
[52] U.S. Cl. .................................. 74/473 P; 180/333
[58] Field of Search .......... 74/473 R, 473 P, 473 SW, 74/471 XY, 469; 180/77 H; 403/57

[56] References Cited

U.S. PATENT DOCUMENTS

| 3,876,020 | 4/1975 | Barsby | 180/77 H |
| 4,040,499 | 8/1977 | Kestian et al. | 74/471 XY |
| 4,120,211 | 10/1978 | Showalter | 74/473 R |
| 4,134,560 | 1/1979 | Messerschmidt | 74/471 XY |
| 4,137,790 | 2/1979 | Hiraiwa | 74/473 R |

FOREIGN PATENT DOCUMENTS

| 2159715 | 6/1973 | Fed. Rep. of Germany | 74/473 P |
| 2745561 | 1/1978 | Fed. Rep. of Germany | 180/77 H |
| 811764 | 4/1959 | United Kingdom | 403/57 |

Primary Examiner—George H. Krizmanich
Attorney, Agent, or Firm—James Creighton Wray

[57] ABSTRACT

The invention comprehends a remote control mechanism comprising push-pull control links operatively connected at one end to spaced locations of a beam, said beam being pivotally movable about mutually displaced first and second axes, said spaced locations of said beam moving equally in the same direction upon pivoting of said beam about said first axis, said spaced locations of said beam moving in opposite directions relative to said control links upon pivoting of said beam about said second axis, one of said axes being fixed and the other axis rotating about said one axis when said beam is pivoted about said one axis, paired coincident movement of said control links being complementary to both said spaced locations of said beam moving equally in said same direction, and differential relative movement of said control links being complementary to said spaced locations of said beam moving in said opposite directions.

36 Claims, 17 Drawing Figures

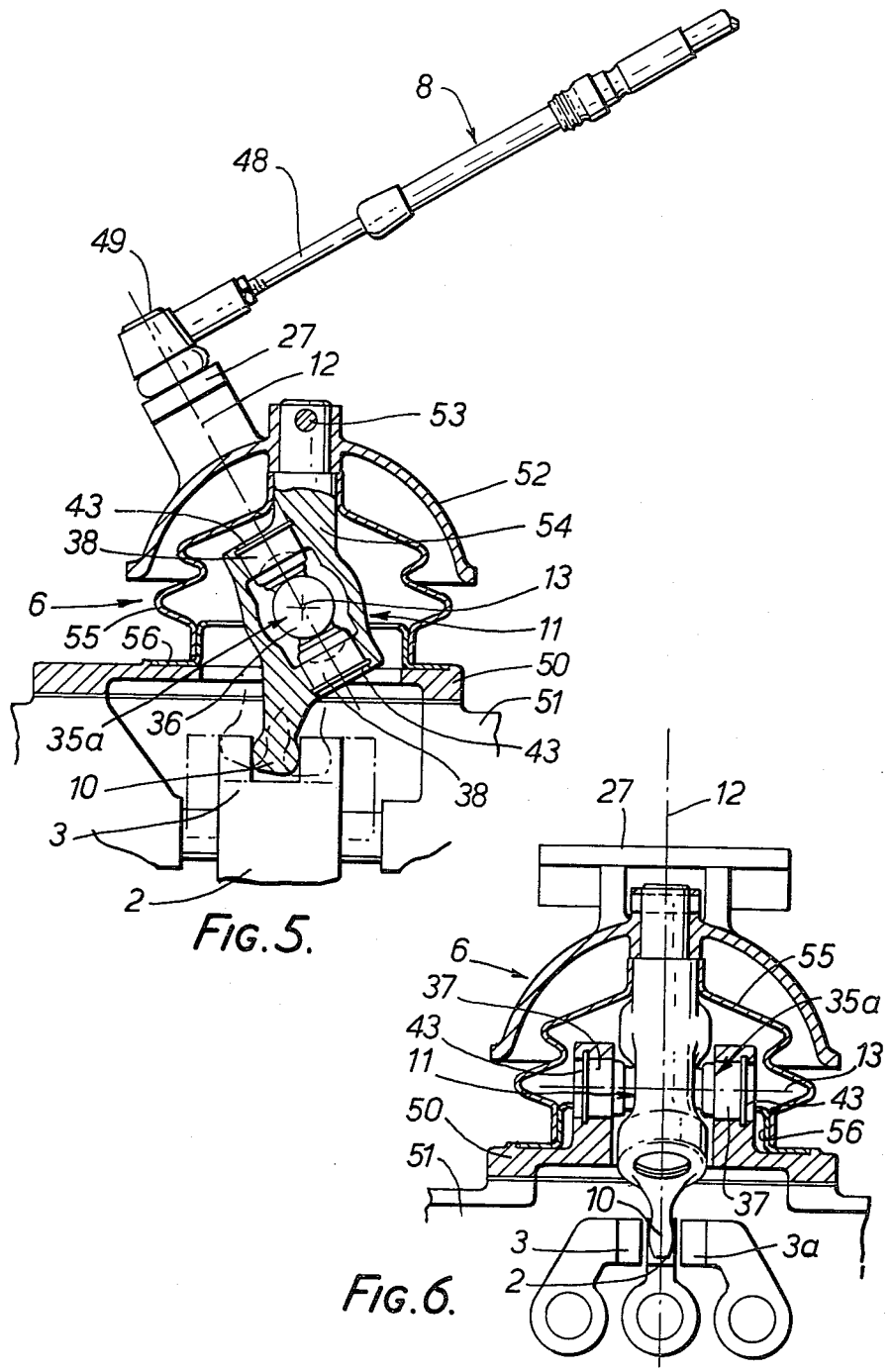

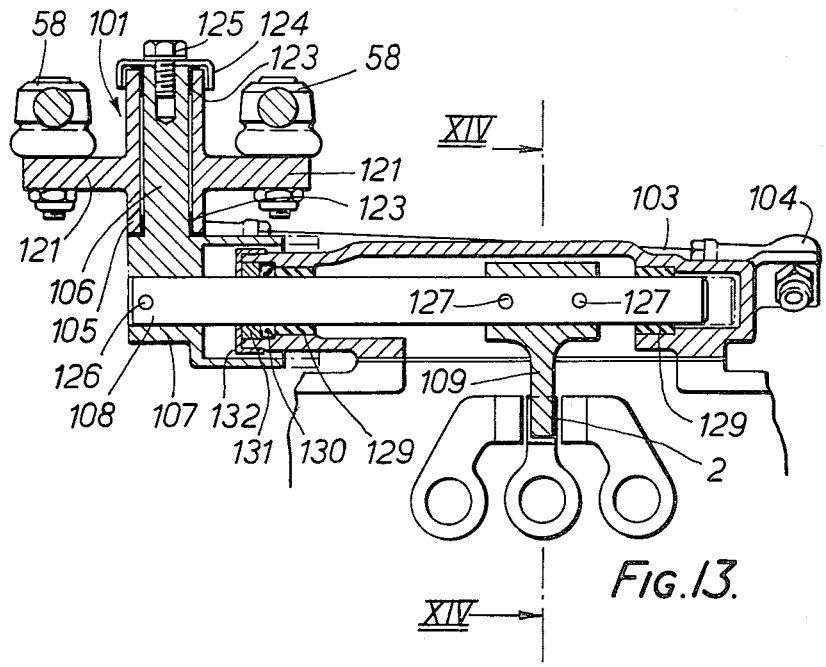
FIG. 13.
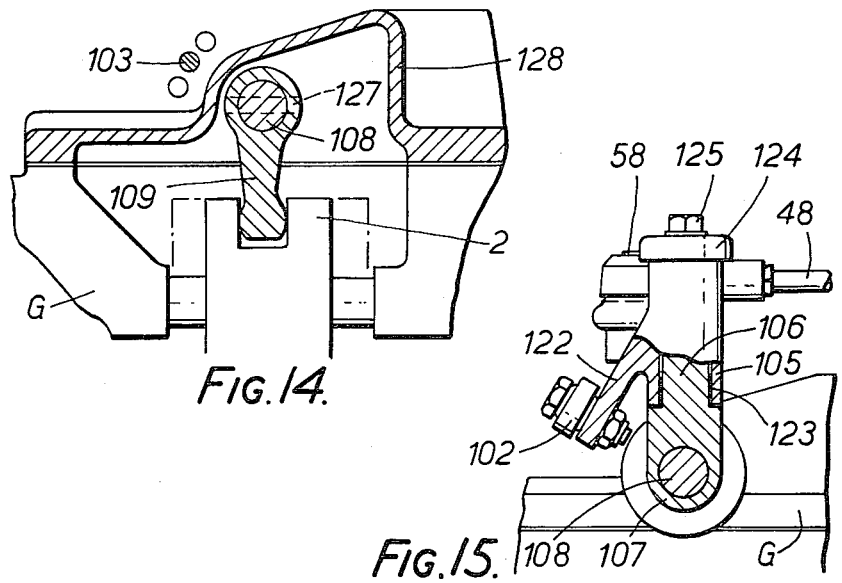
FIG. 14.
FIG. 15.

REMOTE CONTROL MECHANISMS

This invention relates to remote control mechanisms.

The present invention includes a remote control mechanism comprising push-pull control links operatively connected at one end to spaced locations of a beam, said beam being pivotally movable about mutually displaced first and second axes, said spaced locations of said beam moving equally in the same direction upon pivoting of said beam about said first axis, said spaced locations of said beam moving in opposite directions relative to said control links upon pivoting of said beam about said second axis, one of said axes being fixed and the other axis rotating about said one axis when said beam is pivoted about said one axis, paired coincident movement of said control links being complementary to both said spaced locations of said beam moving equally in said same direction, and differential relative movement of said control links being complementary to said spaced locations of said beam moving in said opposite directions.

In our copending United Kingdom patent application No. 25512/77 we have disclosed a remote control mechanism employing a pair of push-pull cables which upon pivotal movement of an operator lever about one axis are differentially moved and which upon pivotal movement of the operator lever about a second axis, perpendicular to the first pivotal axis, are coincidentally moved. Movement of the cables, whether differential or coincidental, causes operating movement of a controlled member. In the specifically described environment of use, the controlled member is a selector and shifter lever of a transmission shifter assembly of a manual change gearbox, such lever being translated to select one of a plurality of gear change rails in response to differential movement of the cables and rotated to translate the selected rail and so effect a gear change in response to coincidental movement of the cables.

Remote control mechanisms constructed in accordance with the present invention constitutes alternatives to that in our aforementioned application.

As is the case of the specifically disclosed remote control mechanism of that aforementioned application No. 25512/77, each of the preferred remote control mechanisms now about to be described is employed with a manual change gearbox, but it is to be understood that the invention is not necessarily restricted to use in such an environment but finds application in other fields.

In order that the invention may be well understood certain preferred embodiments thereof, which are given by way of example, will now be described with reference to the accompanying drawings, in which:

FIG. 3 is a section along line III—III of FIG. 2;

FIG. 5 is a sectioned side elevation of the controlled unit of the remote control mechanism of FIG. 1;

FIG. 6 is a sectioned end elevation of the same controlled unit;

FIG. 13 is a section along line XII—XII of FIG. 12;

FIG. 14 is a section along line XIV—XIV of FIG. 13;

FIG. 15 is a scrap view, partly sectioned along line XV—XV of FIG. 12;

Figure 1:
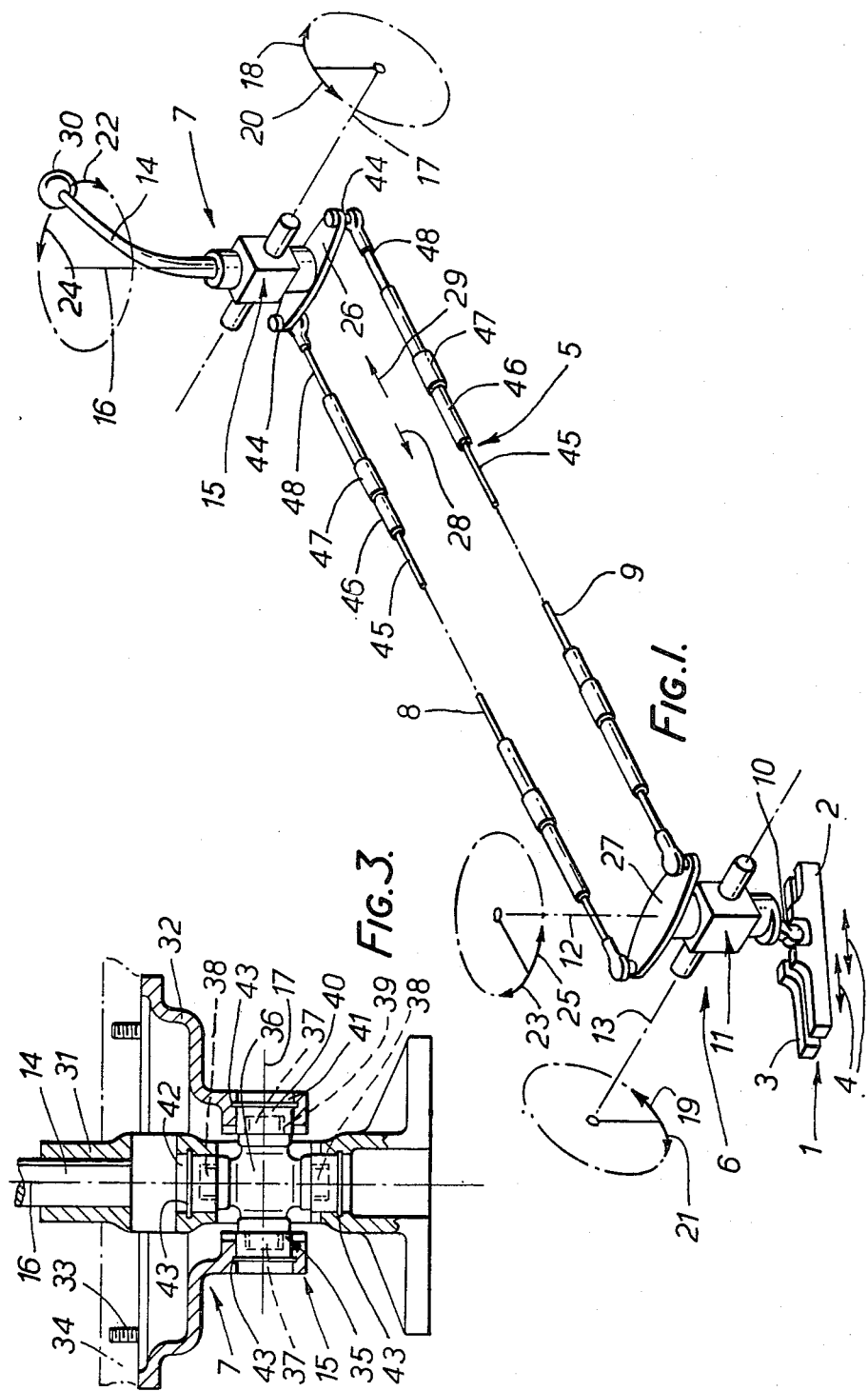
FIG. 1 is a perspective schematic view of one embodiment of remote control mechanism.

Referring first to FIG. 1, a transmission shifter assembly 1 incorporates a plurality of gear change rails of which there are shown two rails 2 and 3. As is conventional, selective translational movement of each of the rails in either of the opposite directions indicated by the respective arrows 4 effects a gear change.

There is provided a remote control mechanism 5 for operating the transmission shifter assembly 1, such mechanism comprising a controlled unit 6, an operator or controller unit 7 and a pair of push-pull cables 8 and 9 for imparting control motion from the operator unit to the controlled unit.

The controlled unit 6 includes a finger 10 operably engageable with either of the gear change rails 2 and 3. The finger 10 is incorporated in a universal joint 11 of the kind known as a Hooke's coupling, by which the finger is mounted for rotation both about a vertical axis 12 and a horizontal axis 13. The horizontal axis 13 is fixed and the vertical axis 12 is rotatable about the fixed horizontal axis. The finger 10 is offset from the vertical axis 12 so as to move around an arc upon being rotated about that axis and so swing from one gear change rail to the other thereby effecting selection of a respective rail. Rotation of the finger 10 about the horizontal axis 13 causes the finger to translate that rail with which at the time it is in engagement and so cause a gear change.

The operator unit 7 includes an operator lever 14 of which the operating motion controls rotation of the finger 10, whether about the horizontal axis 13 or the vertical axis 12.

The operator lever 14 is mounted for pivotal movement, by means of a universal joint 15 also of the Hooke's coupling kind, both about a vertical axis 16 and a horizontal axis 17. As before, the horizontal axis 17 is fixed and the vertical axis 16 is rotatable around the fixed horizontal axis. Pivotal movement of the operator lever 14 about the horizontal axis 17 causes the finger 10 to rotate about the horizontal axis 13. Pivotal movement of the operator lever 14 about the vertical axis 16 causes the finger 10 to rotate about the vertical axis 12.

More particularly, when the operator lever 14 is pivoted about the horizontal axis 17 in the direction of the arrow 18, the finger 10 is rotated in the direction of the arrow 19 so translating the selected gear change rail to the right. Pivotal movement of the operator lever 14 about the same axis 17 but in the direction of the arrow 20 causes the finger 10 to rotate in the direction of the arrow 21 and so translate the selected rail to the left.

When the operator lever 14 is pivoted about the vertical axis 16 and in the direction of the arrow 22, the finger 10 is rotated in the direction of the arrow 23 and is, therefore, swung out of engagement with the rail 2 and into operable engagement with the rail 3. Subsequent movement of the operator lever 14 in the opposite direction 24 about the same axis 16 would swing the finger 10 in the direction of the arrow 25 and hence back into operable engagement with the rail 2.

Such control movement of the operator lever 14 is imparted to the finger 10 through the push-pull cables 8 and 9 which are operably connected at their input end to an output beam 26 of the operator unit 7 and which are operably connected at their output end to an input beam 27 of the controlled unit 6.

The operator lever 14 acts through the output beam 26 on the cables 8 and 9 to selectively coincidentally push the cables, coincidentally pull the cables, and differentially relatively move the cables.

The cables 8 and 9 are coincidentally pushed, in the direction of the arrow 28, upon pivotal movement of the operator lever 14 about the horizontal axis 17 in the direction of the arrow 18. The cables are coincidentally pulled, in the direction of the arrow 29, when the lever is pivoted about the same axis in the opposite direction 20. Finally, the cables are differentially moved, one being pushed and the other being pulled, when the operator lever 14 is pivoted about the vertical axis 16 in either of the directions indicated by the arrows 22 and 24, there being a changeover in the pushing/pulling force applied to the respective cables as the lever is pivoted from the one to the opposite direction about the axis 16. Therefore, coincident (or paired) cable movement performs the shift function, and differential cable movement performs the select function . . . with respect to the gear change rails.

Therefore, each control movement of the operator lever 14 is imparted to the select and shift finger 10 through both push-pull cables 8 and 9 so that whatever the operating mode, the cables share the load. Therefore, at no time is any one cable redundant, and since the load is shared between the two cables, the life thereof is increased.

The Hooke's couplings 15 and 11 of the operator unit 7 and the controlled unit 6 may be similar to one another. Indeed, the entire operator and controlled units may be essentially similar with the one inverted with respect to the other so that the operator lever 14 and the output beam 26 of the operator unit 7 are uppermost and lowermost, respectively, and the shift and select finger 10 . . . the equivalent of the operator lever 14 . . . and the input beam 27 of the controlled unit 6 are lowermost and uppermost, respectively.

As will be appreciated, the operator lever 14 is of bent configuration so that its hand knob 30 is displaced from the vertical axis 16 by which a turning torque can readily be applied to the lever with respect to that axis.

Figure 2:
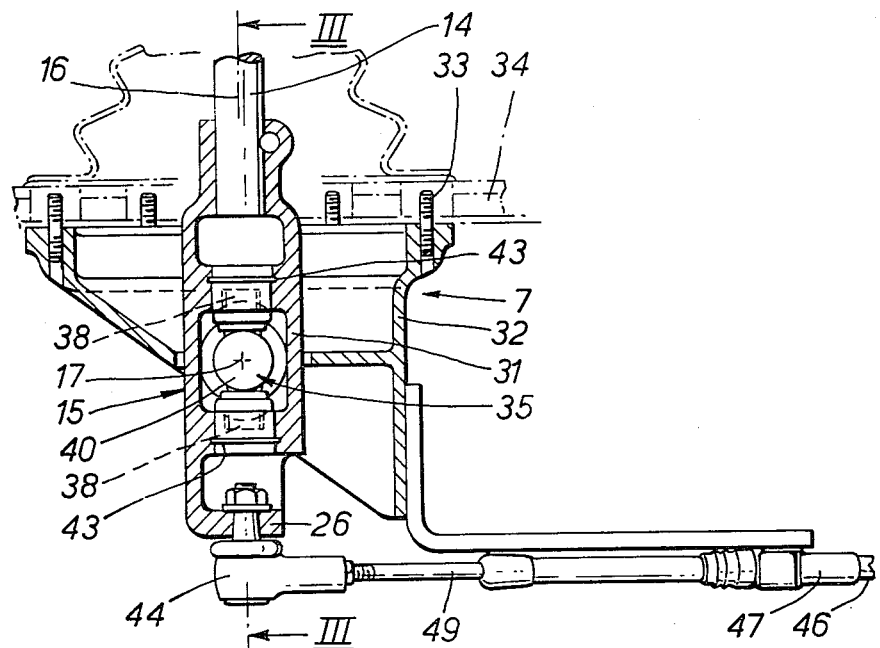
FIG. 2 is a sectioned side elevation of the operator or controller unit of the same remote control mechanism.
Figure 4:
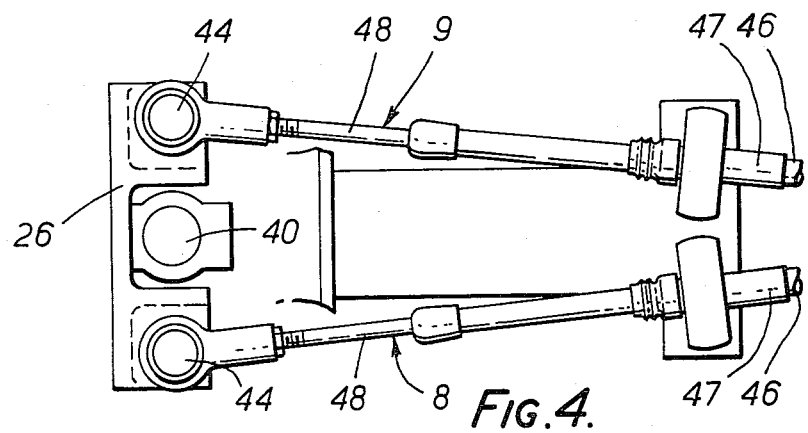
FIG. 4 is an underplan view of the same operator unit.

A preferred operator unit 7 is shown in FIGS. 2 to 4 to which attention is now also directed. The operator lever 14 is clamped in a movable component 31 of the Hooke's coupling 15 of which the fixed component, in the form of a ring flange 32 is affixed as by studs 33 to a support member 34 of a vehicle.

The movable and fixed components 31 and 32, respectively, are operably coupled by a universal joint unit 35 which may be a proprietory item taking the form of a one-piece body 36 integral with four mutually perpendicular solid cylindrical limbs of which the pair of horizontal limbs are referenced 37 and the pair of vertical limbs are referenced 38. Each limb provides a peripheral bearing surface on which is mounted, via needle rollers 39, an end cap 40. The end caps of the horizontal limbs 37 are journalled in opposite apertures 41 in the ring flange 32, and the end caps of the vertical limbs 38 are journalled in opposite apertures 42 in the movable component 31. Circlips 43 in the apertures 41 and 42 hold the universal joint unit 35 in position, and the joint embodies seals to constitute a sealed unit. The vertical axis 16 and horizontal axis 17 are the longitudinal axes of the apertures 42 and 41, respectively.

The movable component 31 incorporates, as an integral part, at its lowermost end, the output beam 26 to the opposite ends of which are connected via ball joints 44 the push-pull cables 8 and 9. More particularly, each cable comprises a flexible core 45 slidably mounted in a guide conduit 46 terminated by a fixed guide tube 47. Each core 45 is fast at its opposite ends with terminal rods 48, and it is those terminal rods at the input end of the cores which are connected to the ball joints 44.

Pivotal movement of the operator lever 14 about the fixed horizontal axis 17 causes the movable component 31 to swing within the ring flange 32, the universal joint body 36 turning with that component so that its horizontal limbs 37 rotate within the needle rollers 39, to urge the beam 26 in a forward or rearward direction thus coincidentally pushing or pulling, respectively, the cables 8 and 9.

Pivotal movement of the operator lever 14 about the vertical axis 16 causes the movable component 31 again to swing within the ring flange 32 but about the vertical limbs 38 of the joint unit 35 to swing the beam 26 in a horizontal plane thus differentially moving the cables 8 and 9.

One preferred controlled unit 6 is shown in FIGS. 5 and 6 to which attention is now further directed. The Hooke's coupling 11 is, in fact, of different detailed construction compared with the corresponding coupling 15 of the operator unit 7 but, in essence, the two couplings are similar. It should also be observed that the "vertical" axis 12 is not truly vertical when the gear change rails are in a neutral position but, rather, is tilted forwardly to lie at an attitude of 30 degrees to the vertical, as is clearly shown in FIG. 5.

The distant ends of the cables 8 and 9 are connected, via the core terminal rods 48, through ball joints 49 to the opposite ends of the input beam 27 which is incorporated in the movable component of the Hooke's coupling 11 of which the fixed component again comprises a ring flange 50 suitably affixed to a gear box 51.

The beam 27 is integral with a protective domed cover 52 affixed, as by being pinned at 53, to a lever 54 the lowermost end of which constitutes the shift and selector finger 10. A universal joint unit 35a, which may, and preferably is, precisely the same as the unit 35, is fitted in the movable component (the lever 54) and the fixed component (the ring flange 50) in the same manner as previously described. Solely for sealing purposes, a bellows seal 55 mounted about a rim 56 is also provided.

When the cables 8 and 9 are coincidentally pulled or pushed, the lever 54 is swung about the horizontal axis 13 to turn the universal joint body 36 so that its horizontal limbs 37 rotate within their needle rollers 39, and the finger 10 will likewise swing to translate the selected gear change rail.

In the event of the cables 8 and 9 being differentially moved, the lever 54 is swung within the ring flange 50 but about the "vertical" limbs 38 of the joint unit 35a and hence about the "vertical" axis 12, and the finger 10 will likewise swing out of engagement with one gear change rail and into engagement with another.

FIG. 6 shows three gear change rails of which the additional rail is referenced 3a. In the central selector position of the operator lever 14, shown in FIG. 1, the finger 10 engages the gear change rail 2; when the operator lever is pivoted about the vertical axis 16 in the direction of the arrow 22, the finger is swung into engagement with the rail 3; and when the operator lever is pivoted in the opposite direction indicated by the arrow 24, the finger is swung from the central selector position into engagement with the rail 3a.

Figure 7:
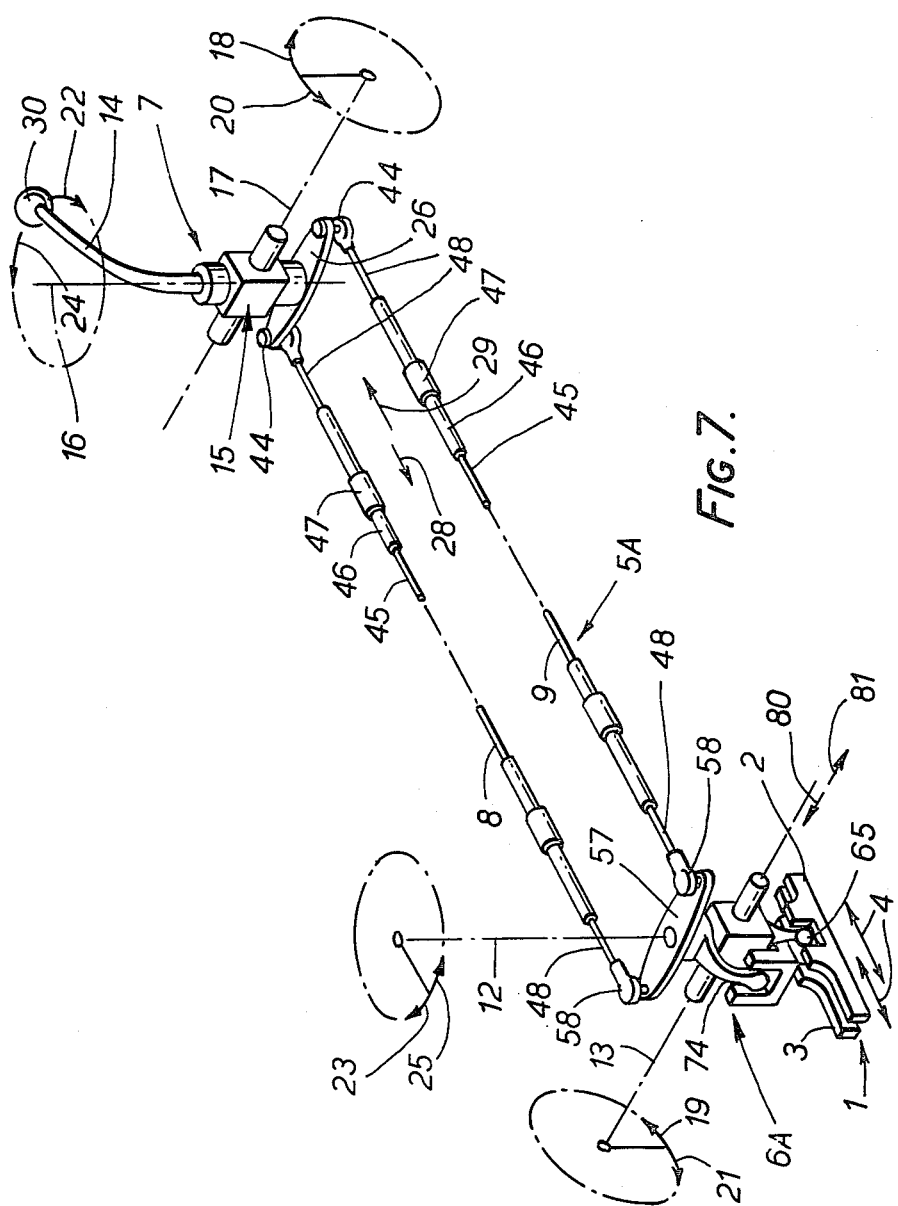
FIG. 7 is a perspective schematic view of another embodiment of remote control mechanism.

An alternative remote control mechanism 5A is shown in FIG. 7. The mechanism is again used to operate a transmission shifter assembly 1, the construction of which is to that already described. Further, the mechanism 5A includes an operator unit 7 and push-pull cables 8 and 9 constructed similarly to the corresponding components of the remote control mechanism 5. The mechanism 5A differs from that of the first embodiment by the construction of its controlled unit, and the description to follow will be substantially confined to that unit, referenced 6A.

Figure 8:
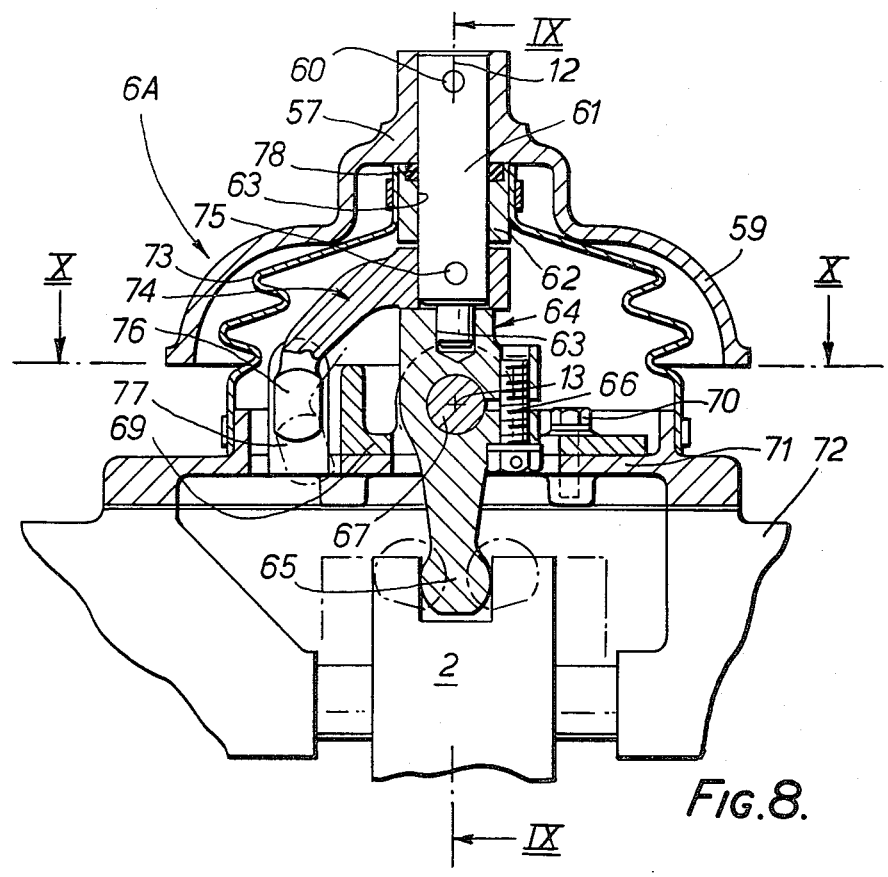
FIG. 8 is a sectioned side elevation, taken along line VIII-VIII of FIG. 9, of the controlled unit of the remote controlled mechanism of FIG. 7.
Figure 10:
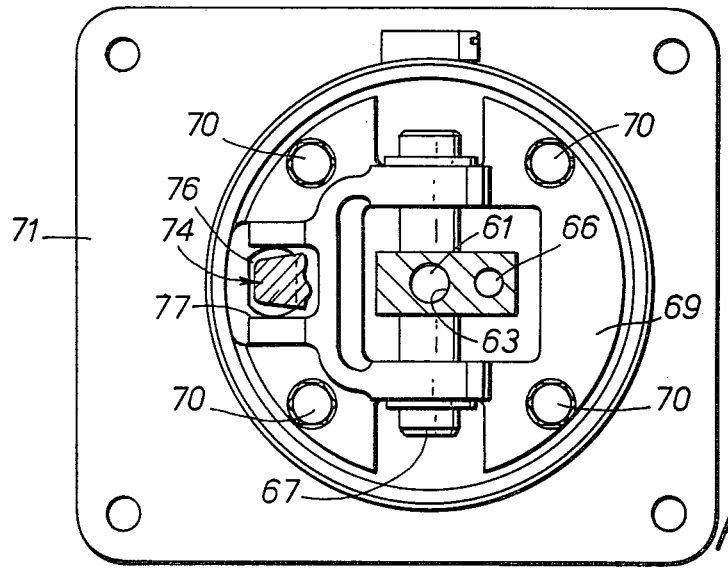
FIG. 10 is a section taken along line X—X of FIG. 8.
Figure 9:
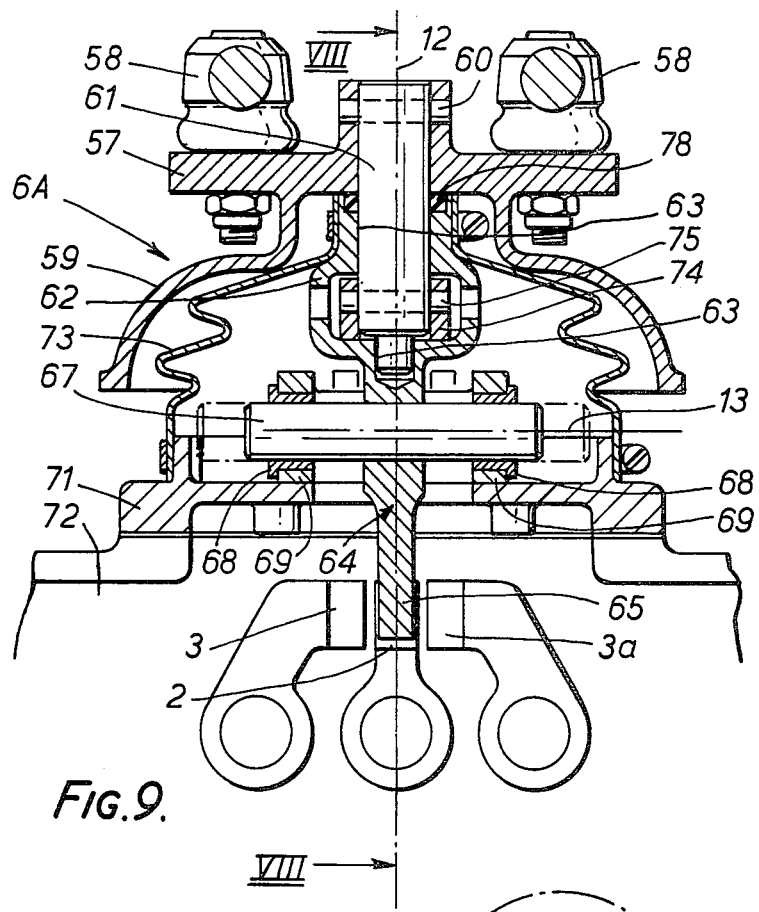
FIG. 9 is a section taken along line IX—IX of FIG. 8.

The controlled unit 6A, which is shown in detail in FIGS. 8, 9 and 10, includes an input beam 57 to the opposite ends of which are operably connected the terminal rods 48 of the distant ends of the cables 8 and 9 through ball joints 58. The beam 57 is integral with a protective domed cover 59 which is affixed, as by being pinned at 60, to a vertical shaft 61 mounted for rotation about the vertical axis 12.

More precisely, the shaft 61 is rotatably mounted in the upper yoked end 62, by means of journal bearings 63, of a gearshift and selector lever 64 the lower end of which constitutes a gear selector and shift finger 65 which performs the same operating function in relation to the gear shift rails as that of the finger 10 of the mechanism 5. However, the control movements of the finger 64 when executing a selector change are different, as will be explained. The gear shift movements are, though, no different; the finger 64 is rotated about the horizontal axis 13 in either of the opposite directions 19 and 21, thereby to translate either right or left, respectively, the selected rail, in response to pivotal movement of the operating lever 14 about the horizontal axis 17 in either of the directions 18 and 20, respectively.

The intermediate region of the lever 64 is mounted on and clamped to, as by a bolting means 66, a horizontal shaft 67 arranged both for rotation about the "fixed" horizontal axis 13 and longitudinal sliding motion along that axis in bushes 68 mounted in a ring casting 69. The casting 69 is affixed, as by bolts 70, to a ring flange 71 constituting the cover plate of a gearbox 72.

A lever arm 74 has its upper end mounted on the vertical shaft 61, within the yoked end 62 of the lever 64, and affixed thereto being pinned at 75. The lever arm extends radially outwardly and downwardly from that mounting to terminate in a ball end 76 which engages in a slot 77 formed in the ring casting 69.

The controlled unit 6A is completed by the provision of a bellows seal 73 affixed at its lower end to the cover plate 71 and at its upper end to the uppermost region of the gear shift and selector lever 64 between which and the adjacent region of the domed cover 59 is mounted a seal 78.

In operation, when the operator lever 14 is pivoted about the horizontal axis 17 in the direction of the arrow 18, the output beam 26 coincidentally pushes the cables 8 and 9 in the direction of the arrow 28 which, in turn, apply a pushing force to the input beam 57 of the controlled unit 6A. The beam 57, through the vertical shaft 61, applies a turning moment to the gear shift and selector lever 64 which will rotate the horizontal shaft 67 within the bushes 68, thereby the lever 64 with its finger 65 will rotate about the horizontal axis 13 in the direction of the arrow 19, so that the finger will translate the gear shift rail with which it is engaged in the direction of the arrow 4 to the right.

When the operator lever 14 is pivoted about the horizontal axis 17 but in the opposite direction 20, the cables 8 and 9 are coincidentally pulled, in the direction of the arrow 29, and, through the input beam 57 and the vertical shaft 61, will cause the gear shift and selector lever 64 to rotate with the horizontal shaft 67 in the opposite direction 21 about the horizontal axis 13 by which the finger 65 will translate the same selected rail in the direction of the arrow 4 but to the left.

Since the lever arm 74 is fast with the vertical shaft 61, then, as that shaft turns with the gear shift and selector lever 64 about the horizontal axis 13, the lever arm will likewise rotate and swing in a vertical plane at which time its ball end 76 will ride up or down within the slot 77 in the ring casting 69.

When the operator lever 14 is pivoted about the vertical axis 16 in the direction of the arrow 24, the output beam 26 will swing to pull the cable 9 in the direction of the arrow 29 and push the cable 8 in the direction of the arrow 28. Such differential cable motion is transmitted to the input beam 57 which tends to rotate with the vertical shaft 61 within the yoked end 62, at the bearings 63, of the gear shift and selector lever 64 about the vertical axis 12 in the direction of the arrow 25. However, the lever arm 74 which, as said, is pinned to the vertical shaft 61, is prevented by the cooperation of its ball end 76 with the wall of the casting slot 77 from turning with the vertical shaft and, instead, the vertical shaft will swing about an offset vertical axis using that point at which the ball end engages the wall of the slot at its pivot. This causes the gear shift and selector lever 64 to move laterally with its horizontal shaft 67 sliding in the bushes 68 so that the finger will translate along the horizontal axis 13 in the direction of arrow 80 out of engagement with the rail 2 and into engagement with the rail 3.

Pivotal movement of the operator lever 14 in the opposite direction 22 about the vertical axis 16 effects differential movement of the cables 8 and 9 such as to tend to swing the input beam 57 about the vertical axis 12 in the direction of the arrow 23 but, as before, the ball end 76 will cooperate with the (opposite) wall of the slot 77 to cause the gear shift and selector lever 64 to move with its horizontal shaft 67 laterally in the opposite direction from before so that the finger 65 will translate along the horizontal axis 13 in the direction of arrow 81 and thereby move from engagement with the rail 2 into engagement with the rail 3a (shown in FIG. 9).

Whilst in the described embodiments, the push-pull cables are flexible cables comprising a core slidable within a conduit, they could take the form of solid rods.

Alternatively, a single conduit having two coaxial cores could be utilized instead of the described pair of coaxial cables 8 and 9. Yet again a single coaxial cable could be utilised in which both the core and the conduit are slidable, each performing the function of one of the cables 8 and 9.

Use of the described Hooke's coupling universal joint unit 35 makes for an operator unit and, selectively, a controlled unit lending itself to inexpensive production.

Either of the controlled units is adapted to operate what is termed a "side entry" gear shift and selector shaft as compared with that of our aforementioned patent application which is designed for use with "top entry" gearboxes. Thereby, the presently described remote control mechanisms are particularly suited for use with vehicles designed to take advantage of low profile tyres.

In the foregoing arrangements, differential cable movements can be reversed between the control and the controlled members by crossing the cable paths.

Figure 11:
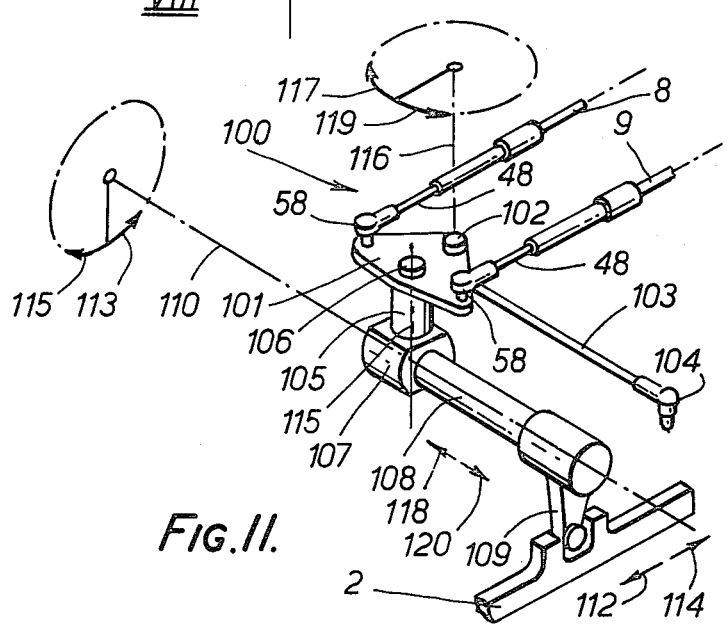
FIG. 11 is a perspective schematic view of the controlled unit of a further embodiment of remote control mechanism.
Figure 12:
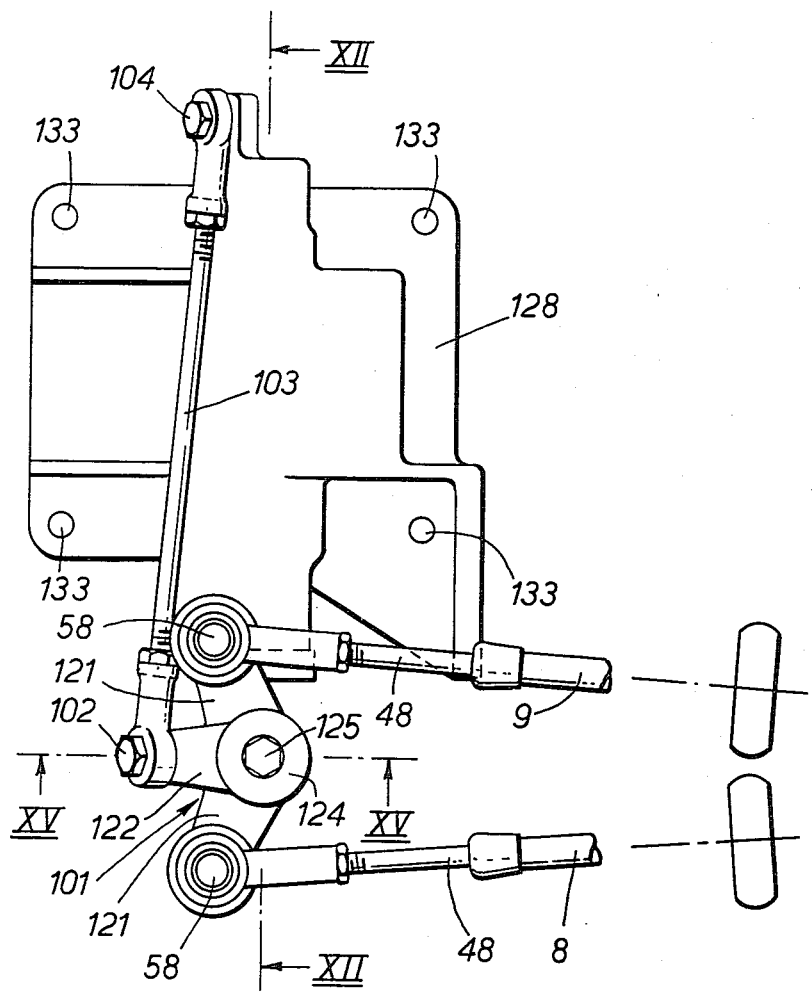
FIG. 12 is a plan view of the controlled unit of FIG. 11 reduced to practice.

A controlled unit 100 of FIG. 11 is an alternative to the controlled units disclosed hereinbefore and in our aforementioned patent application and may be adopted in any of the remote control mechanisms thereof. In particular, the present controlled unit is a preferred alternative to the controlled unit 6A illustrated in FIGS. 7 to 10 and will be described as replacing the unit 6A in the remote control mechanism 5A.

It is to be understood that the controlled unit 100 is used to operate the hereinbefore featured transmission shifter assembly 1 and that the operator unit 7 (not shown) and push-pull cables 8 and 9 are constructed as previously described before. Accordingly, the present description will be substantially confined to the controlled unit 100.

The controlled unit 100 includes an input beam 101 which is operably connected at spaced apart points to the terminal rods 48 of the distant ends of the cables 8 and 9 through ball joints 58. The input beam 101 is also connected at an intermediate point via a ball joint 102 to one end of a transverse reaction rod 103, the other end of which is connected via a ball joint 104 to a fixed anchorage.

The beam 101 is fast with an upright tube 105 which is journalled for rotation about a vertical pin 106 the lower end of which is fast with a body member 107 which is affixed to a transverse shaft 108 carrying a gear selector and shift finger 109. Whilst not shown in FIG. 11, the shaft 108 would be journalled for rotation about its longitudinal axis 110 and supported for sliding movement in the direction of that axis as in a cover plate of the gearbox.

The finger 109 is operably engageable with any one of a number of gearchange rails of which only the central rail 2 is shown. Translational movement of any of those rails in either of the opposite directions indicated effects a gear change. Sliding movement of the shaft 108 in the direction of its axis 110 shifts the finger 109 from operative engagement with one rail into engagement with another. Rotation of the shaft 108 about its axis 110 rotates the finger 109 to cause translational movement of that rail with which the finger at the time is in operative engagement.

When the cables 8 and 9 are coincidentally pulled . . . by appropriate operation of the operator lever 14 . . . a turning moment is applied to the beam 101 which, through the tube 105, the pin 106 and the body member 107, causes rotation of the shaft 108 about its axis 110 in the direction of the arrow 111. The finger 109 is thus swung clockwise to translate the rail 2 to the left in the direction of the arrow 112.

When the cables 8 and 9 are coincidentally pushed . . . again by appropriation operation of the operator lever, about the same pivot axis but in the opposite direction . . . a turning moment is applied to the beam 101, but in the opposite direction, and this, via the tube 105, the pin 106 and the body member 107, rotates the shaft 108 about its axis 110 in an anticlockwise direction as indicated by the arrow 113. The finger 109 is, accordingly, swung anticlockwise to shift the rail 2 to the right in the direction of the arrow 114.

When the cables 8 and 9 are differentially moved . . . by appropriate operation of the operator lever . . . such that the cable 8 is pulled and the cable 9 is pushed, a turning moment is applied to the beam 101 tending to rotate it and the tube 105 with which it is fast about the vertical pin 106 and hence about the vertical longitudinal axis 115 of that pin. However, the beam 101 cannot freely rotate about the pin 106 since it is restrained by the reaction rod 103 coupled to it via the ball joint 102. The result is that the beam 101 tends also to rotate about a vertical axis 116 passing through the ball joint 102, in a clockwise direction denoted by the arrow 117. The beam 101 cannot execute that movement either, though, since it is mechanically connected via the tube 105, pin 106 and body member 107 with the shaft 107 which, as said, is mounted in the gearbox cover plate.

The shaft 107 is, as stated, mounted for axial sliding movement. The net result of the differential movement of the cables 8 and 9 is that the reaction rod 103 swivels about its ball joint 104 so that the vertical axis 116 moves to an extent such that the arc through which the beam 101 tends to turn straightens out into a line of movement parallel to the longitudinal axis 110. Hence, the shaft 107 is caused to move axially, and to the left as indicated by the arrow 118, from registry with the central rail and into engagement with the adjacent left-hand rail (not shown). At that time, concomittant motion, either pushing or pulling, of the cables 8 and 9 will translate the newly selected rail in the manner already described.

It will be appreciated that opposite differential movement of the cables 8 and 9, with the former being pushed and the latter being pulled, will effect similar motion of the various movable parts of the mechanism albeit in the opposite direction. Hence, the beam 101 will tend to turn on an arc about the vertical axis 116 in an anticlockwise direction denoted by the arrow 119 but will, in the event, move in the direction of the axis 110 to shift the shaft 108 to the right as indicated by the arrow 120. The finger 109 will move with the shaft 108 and hence from registry with the central rail 2 into register with the adjacent right-hand rail (not shown). When so registered, concomittant motion of the cables 8 and 9 will translate the newly selected rail to effect a gear change, as before.

Amongst the advantages of the described construction are that the operating cables are offset from the centreline of the gear box and so are more easily led past the engine cylinder block; also, conventional seals can be utilized to seal the gearshift opening to the gear box with the sliding and rotating shaft construction carrying the selector and change finger 109.

The controlled unit of FIGS. 12 to 15 is the functional equivalent of that of FIG. 1 and, where appropriate, like parts in the two constructions will be denoted by like references. Furthermore, the practical embodiment will only be described insofar as it differs in construction to the schematic controlled unit.

Thus, the beam 101 is fashioned, in plan, as a Tee-piece with its opposite arms 121 connected by the ball joints 58 to the cable rod ends 48. The stem 122 of the Tee-piece is angled downwardly from the tube 105 which is in one-piece with the beam 101, and the ball joint 102 couples the stem 122 to the reaction rod 103.

The beam tube 105 is journalled on the pin 106 via bearing bushes 123 and located in position by a cap 124 bolted at 125 to the pin. The pin 106 is fashioned in one-piece with the body member 107 which is pinned at 126 to the shaft 108. The finger 109 is pinned at 127 to an intermediate region of the shaft 108.

The shaft 108 is mounted for rotation about its own axis 110 and for axial sliding moment in the gear box cover plate 128 via bearings 129. One end of that cover plate is open, and the bearing 129 at that end is supplemented by a garter type oil seal 130 and a lubricant impregnated felt ring 131, a cap 132 sealing off that open end. The cover plate 128 is bolted at 133 to the gear box G, and the "fixed" end of the reaction rod 103 may have its ball joint 104 coupled to the cover plate 128.

It is believed that the operation of the practical embodiment of controlled unit is self evident from the description already given.

As described and illustrated, the controlled unit is used with a "top entry" gear box. However, the gear box could equally as well be laid on its side in which case the "top entry" would become a "side entry" without effecting the construction of the controlled unit which is also useable with "true" side entry boxes. When used with a "side entry" gear box, the various components of the controlled unit would be turned through 90° such that the beam would lie in a vertical, rather than a horizontal, plane. However, the unit would still function in the manner described.

Also, whilst the controlled unit may comprise all the components which have been described, where the gear box is already provided with an appropriate transverse shaft carrying a gear selector and shift finger, the controlled unit may be deficient of those items and thereby be simplified to incorporate the beam and integral tube, ball joints for coupling to the rod ends, a pin and integral block for picking up on the projecting end of the shaft, and the reaction rod with its ball joints.

As another alternative, the ball joints 58 need not have vertical axes and be coupled to the top of the beam, but could be turned through 90° so that their axes are horizontal and be connected to side mountings of the beam.

Figure 16:
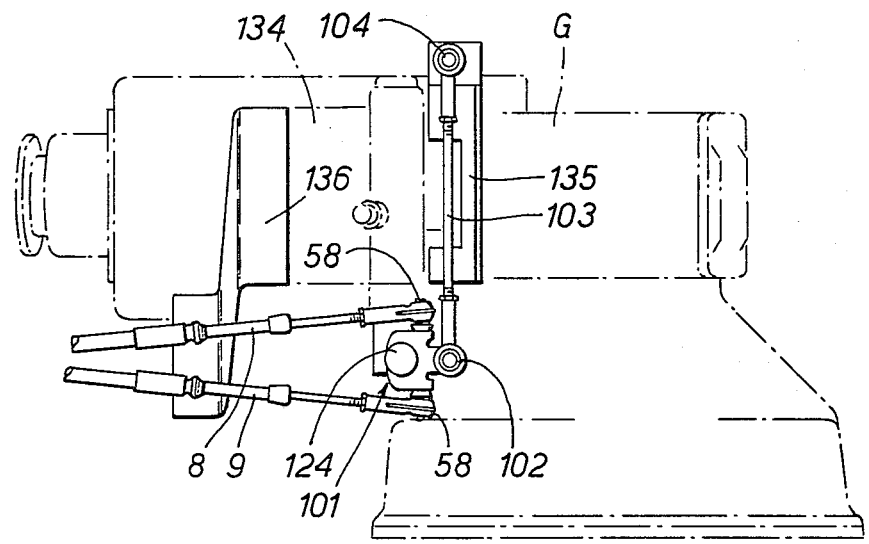
FIG. 16 is a plan view of yet a further alternative controlled unit shown fitted to a "top entry" gearbox.
Figure 17:
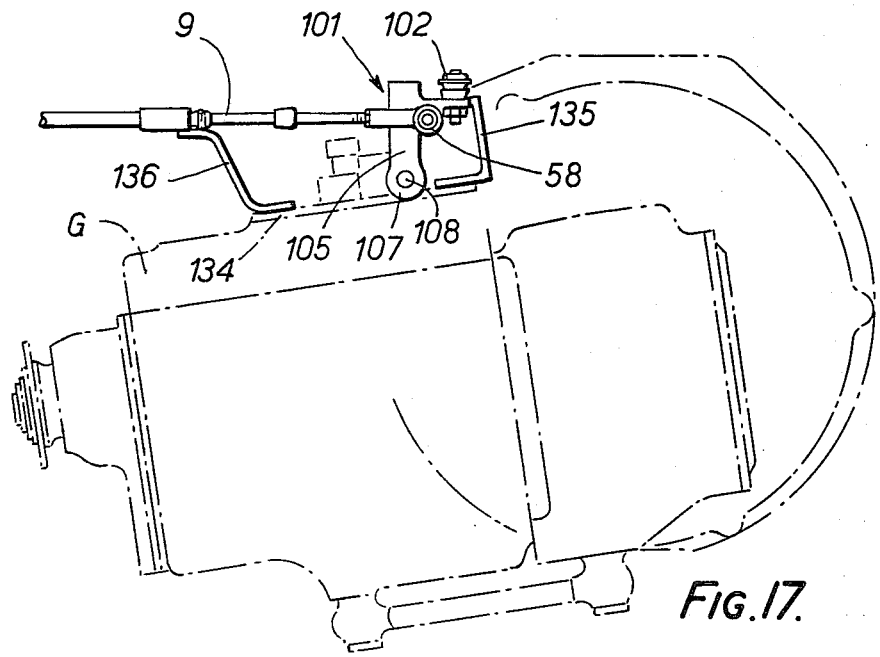
FIG. 17 is a side elevation of the assembly illustrated in FIG. 16.

One such construction, in which the gear box G is at right angles to the engine (not shown) is depicted in FIGS. 16 and 17. The gear box is already provided with a gear selector and shaft finger, transverse shaft and cover plate. The "horizontal axis" ball joints 58 are clearly shown connected to the sides of the one-piece beam 101 and tube 105. The distant end of the reaction rod 103 has its ball joint 104 coupled to a bracket 135 bolted to the cover plate 134 of the gear box, as also is a second bracket 136 to which the casings of the cables 8 and 9 are anchored.

I claim:

1. A remote control mechanism comprising push-pull control links operatively connected at one end to spaced locations of a beam, said beam being pivotally movable about mutually displaced first and second axes, said axes are rotational axes of a Hooke's-type coupling, said spaced locations of said beam moving equally in the same direction upon pivoting of said beam about said first axis, said spaced locations of said beam moving in opposite directions relative to said control links upon pivoting of said beam about said second axis, one of said axes being fixed and the other axis rotating about said one axis when said beam is pivoted about said one axis, paired coincident movement of said control links being complementary to both said spaced locations of said beam moving equally in said same direction, and differential relative movement of said control links being complementary to said spaced locations of said beam moving in said opposite directions.

2. A remote control mechanism as claimed in claim 1, wherein said second axis is spaced centrally of said spaced locations of said beam by which said spaced locations will move equally but in said opposite directions upon pivotal movement of said beam about said second axis.

3. A remote control mechanism as claimed in claim 1, wherein said first axis is horizontal and said second axis is contained in a vertical plane.

4. A remote control mechanism as claimed in claim 1, wherein said first axis is horizontal and constitutes said fixed axis, and wherein said second axis moves in a vertical plane when rotating about said fixed, horizontal first axis.

5. A remote control mechanism as claimed in claim 1, wherein said first and second axes mutually intersect.

6. A remote control mechanism as claimed in claim 1, wherein said Hooke's coupling comprises a fixed component, a movable component, said movable component being fast with said beam, and a universal joint unit having four mutually perpendicular limbs, one opposite pair of said limbs being mounted for rotation in said fixed component, and the other opposite pair of said limbs having said movable component mounted for rotation thereabout.

7. A remote control mechanism as claimed in claim 6, wherein said beam is part of a control device having a control member operatively associated with said beam and operable upon being pivoted in one direction about said first axis to effect via said beam coincidental pulling of said control links, operable upon being pivoted in the opposite direction about said first axis to effect via said beam coincidental pushing of said control links, operable upon being pivoted in one direcction about said second axis to effect via said beam pushing of one of said control links and pushing of the other of said control links, and operable upon being pivoted in the opposite direction about said second axis to effect via said beam pulling of said one control link and pushing of said other control link.

8. A remote control mechanism as claimed in claim 7, wherein said second axis is a vertical axis when said control member is in a neutral position at which said control links are neither pushed nor pulled by said beam.

9. A remote control mechanism as claimed in claim 8, wherein said control member is an operator lever having a manually grippable means displaced from said vertical axis to facilitate the application of a turning torque to the lever with respect to that axis.

10. A remote control mechanism as claimed in claim 7, wherein said control member is fast with said movable component.

11. A remote control mechanism as claimed in claim 6, wherein said beam is part of a controlled device, coincidental pushing of said control links causing said spaced locations of said beam to move equally in one direction and said beam to pivot in one direction about said first axis, coincidental pulling of said control links causing said spaced locations of said bram to move equally in the opposite direction and said beam to pivot in the opposite direction about said first axis, pushing of one of said control links and pulling of the other of said control links causing said spaced locations of said beam to move in opposite directions and said beam to pivot in one direction about said second axis, and pulling of said one control link and pushing of said other control link causing said spaced locations of said beam to move in opposite directions such that said beam pivots in the opposite direction about said second axis.

12. A remote control mechanism as claimed in claim 11, wherein said controlled device includes a controlled member operatively associated with said beam to pivot about said first and second axes as said beam pivots about those same axes.

13. A remote control mechanism as claimed in claim 12, wherein said control device beam and said controlled device beam are operatively connected to opposite ends of said control links.

14. A remote control mechanism as claimed in claim 13, wherein said controlled member faithfully reproduces the movement of said control member.

15. A remote control mechanism as claimed in claim 12, wherein said controlled member is displaced from both said first and second axes by which to move in an arc about each said axis when pivoted about the same.

16. A remote control mechanism as claimed in claim 15, wherein said controlled member is a gear shift and selector finger which executes a select movement with respect to a plurality of gear change rails when pivoted about said second axis and which translates the selected rail when pivoted about said first axis.

17. A remote control mechanism as claimed in claim 7, including a controlled device operatively connected to the opposite end to said control links, said controlled device including controlled means supported for linear movement along a longitudinal axis and pivotal movement about said longitudinal axis, said coincidental pulling of said control links effecting pivotal movement of said controlled means in one direction about said longitudinal axis, said coincidental pushing of said control links effecting pivotal movement of said controlled means in the opposite direction about said longitudinal axis, said pushing of said one control link and pulling of said other control link effecting linear movement of said controlled means in one direction along said longitudinal axis, and said pulling of said one control link and pushing of said other control link effecting linear movement of said controlled means in the opposite direction along said longitudinal axis.

18. A remote control mechanism as claimed in claim 17, wherein said controlled device includes a controlled beam connected at spaced locations thereof to said other end of said control links, said controlled beam being mounted for pivotal movement about said longitudinal axis, said coincidental pushing and pulling of said control links effecting pivoting of said controlled beam about said longitudinal axis in one and the opposite direction respectively, means operatively interconnecting said controlled beam with said controlled means to pivot said controlled means in either of opposite directions about said longitudinal axis in dependence on the direction of said pivotal movement of said controlled beam, means mounting said controlled beam for pivotal movement about an axis transverse to said longitudinal axis by which said controlled beam will tend to pivot about said transverse axis in one or the opposite direction in response to the mode of said differential relative movement of said control links, and means operative to convert such pivotal movement of said controlled beam about said transverse axis into said linear movement of said controlled means along said longitudinal axis and in either of two opposite directions therealong in dependence on the direction of said pivotal movement.

19. A remote control mechanism as claimed in claim 20, wherein said means to convert comprises a reaction means operable in response to said controlled beam tending to pivot in either of opposite directions about said transverse axis to provide a reaction pivotal axis about which said controlled beam will also tend to pivot, the resultant motion of said controlled beam being the combination of the two arcs of pivotal movement thereof about said transverse and reaction pivotal axes which make for a linear movement of said controlled beam in the direction of said longitudinal axis.

20. A remote control mechanism as claimed in claim 19, wherein said reaction means comprises a reaction rod having one end mounted to a fixed part and its opposite end mounted to said controlled beam, said mountings providing for pivotal motion of said reaction rod relative to said fixed part and said controlled beam such that said reaction pivotal axis is movable about said mounting of said reaction rod to said fixed part, said reaction rod turning with said controlled beam when said controlled beam pivots about said longitudinal axis.

21. A remote control mechanism as claimed in claim 20, wherein said controlled means comprises a controlled member which is spaced remote from said transverse axis in the direction of said longitudinal axis.

22. A remote control mechanism as claimed in claim 21, wherein said controlled member is fast with one region of a shaft having a longitudinal axis which is the same as said first-mentioned longitudinal axis, said shaft being mounted for axial movement and rotational movement about its longitudinal axis, a second region of said shaft axially spaced from said one region carrying a pivot post whose axis is said transverse axis, said controlled beam being mounted on said pivot post.

23. A remote control mechanism as claimed in claim 22, wherein said pivot post is fast with said shaft, and said controlled beam is mounted for rotation about said post.

24. A remote control mechanism as claimed in claim 18, wherein said controlled means is a gear selector and shift finger.

25. A remote control mechanism as claimed in claim 19, wherein said reaction means comprises a reaction member fast with a pin and having a reaction end guided in a track to provide a movable said reaction pivotal axis, said pin being fast with said controlled beam and mounted for rotation about its longitudinal axis, said longitudinal axis providing said transverse axis about which said controlled beam is pivotable, said reaction end being spaced from said transverse axis, said pin being mounted for its said rotation in a controlled member which constitutes said controlled means and which is fast with a shaft, said shaft axis constituting said longitudinal axis, said shaft being mounted for axial movement and rotational movement about its longitudinal axis.

26. A remote control mechanism as claimed in claim 25, wherein said controlled member is a gear selector and shift finger.

27. A remote control mechanism comprising
a controlled device including a controlled means and a controlled beam,
control links connected at spaced locations of the controlled beam, said controlled beam being mounted in pivotal movement about a longitudinal axis, wherein coincidental pushing and pulling of said control links effects pivoting of said controlled beam about the longitudinal axis in one and an opposite direction respectively,
means operatively interconnecting the controlled beam with the controlled means to pivot the controlled means in either of opposite directions about the longitudinal axis in dependence on the direction of the pivotal movement of the controlled beam,
means mounting the controlled beam for pivotal movement about an axis transverse to the longitudinal axis by which the controlled beam will tend to pivot about the transverse axis in one and an opposite direction, in response to differential relative movement of the control links, and
conversion means for converting pivotal movement of the controlled beam about the transverse axis into linear movement of the controlled means along the longitudinal axis and in either of two opposite directions therealong in dependence on the direction of the pivotal movement.

28. A remote control mechanism as claimed in claim 27, wherein said conversion means compries a reaction means operable in response to said controlled beam tending to pivot in either of opposite directions about said transverse asxis to provide a reaction pivotal axis about which said controlled beam will also tend to pivot, the resultant motion of said controlled beam being the combination of the two arcs of pivotal movement thereof about said transverse and reaction pivotal axes which make for a linear movement of said controlled beam in the direction of said longitudinal axis.

29. A remote control mechanism as claimed in claim 28, wherein said reaction means comprises a reaction rod having one end mounted to a fixed part and its opposite end mounted to said controlled beam, said mountings providing for pivotal motion of said reaction rod relative to said fixed part and said controlled beam such that said reaction pivotal axis is movable about said mounting of said reaction rod to said fixed part, said reaction rod turning with said controlled beam when said controlled beam pivots about said longitudinal axis.

30. A remote control mechanism as claimed in claim 29, wherein said controlled means comprises a controlled member which is spaced remote from said transverse axis in the direction of said longitudinal axis.

31. A remote control mechanism as claimed in claim 30, wherein said controlled member is fast with one region of a shaft having a longitudinal axis which is the same as said first-mentioned longitudinal axis, said shaft being mounted for axial movement and rotational movement about its longitudinal axis, a second region of said shaft axially spaced from said one region carrying a pivot post whose axis is said transverse axis, said controlled beam being mounted on said pivot post.

32. A remote control mechanism as claimed in claim 31, wherein said pivot post is fast with said shaft, and said controlled beam is mounted for rotation about said post.

33. A remote control mechanism as claimed in claim 27, wherein said controlled means is a gear selector and shift finger.

34. A remote control mechanism as claimed in claim 28, wherein said reaction means compries a reaction member fast with a pin and having a reaction end guided in a track to provide a movable said reaction pivotal axis, said pin being fast with said controlled beam and mounted for rotation about its longitudinal axis, said longitudinal axis providing said transverse axis about which said controlled beam is pivotable, said reaction end being spaced from said transverse axis, said pin being mounted for its said rotation in a controlled member which constitutes said means and which is fast with a shaft, said shaft axis constituting said longitudinal axis, said shaft being mounted for axial movement and rotational movement about its longitudinal axis.

35. A remote control mechanism as claimed in claim 27, wherein said controlled member is a gear selector and shift finger.

36. In a differential push-pull control apparatus comprising a controlled device, plural push-pull links connected to the controlled device at spaced connections, support means connected to the device for supporting movement of the device in a first mode upon paired coincident movement of the links and movement of the device in a second mode upon differential relative movement of the links, and controlling means connected to the links remote from the controlled device for selectively coincidentally moving the links and differentially relatively moving the links, the improvement comprising: said push-pull links operatively connected at one of said controlled device and said controlling means to spaced locations of a beam, said beam being pivotally movable about mutually displaced first and second axes, said spaced locations of said beam moving equally in the same direction upon pivoting of said beam about said first axis, said spaced locations of said beam moving in opposite directions relative to said links upon pivoting of said beam about said second axis, one of said axes being fixed and the other axis rotating about said one axis when said beam is pivoted about said one axis, paired coincident movement of said links being complementary to both said spaced locations of said beam moving equally in said same direction, and differential relative movement of said links being complementary to said spaced locations of said beam moving in said opposite directions.

* * * * *